INVENTOR.
MARTIN CASTRICUM
BY James J. Long
AGENT

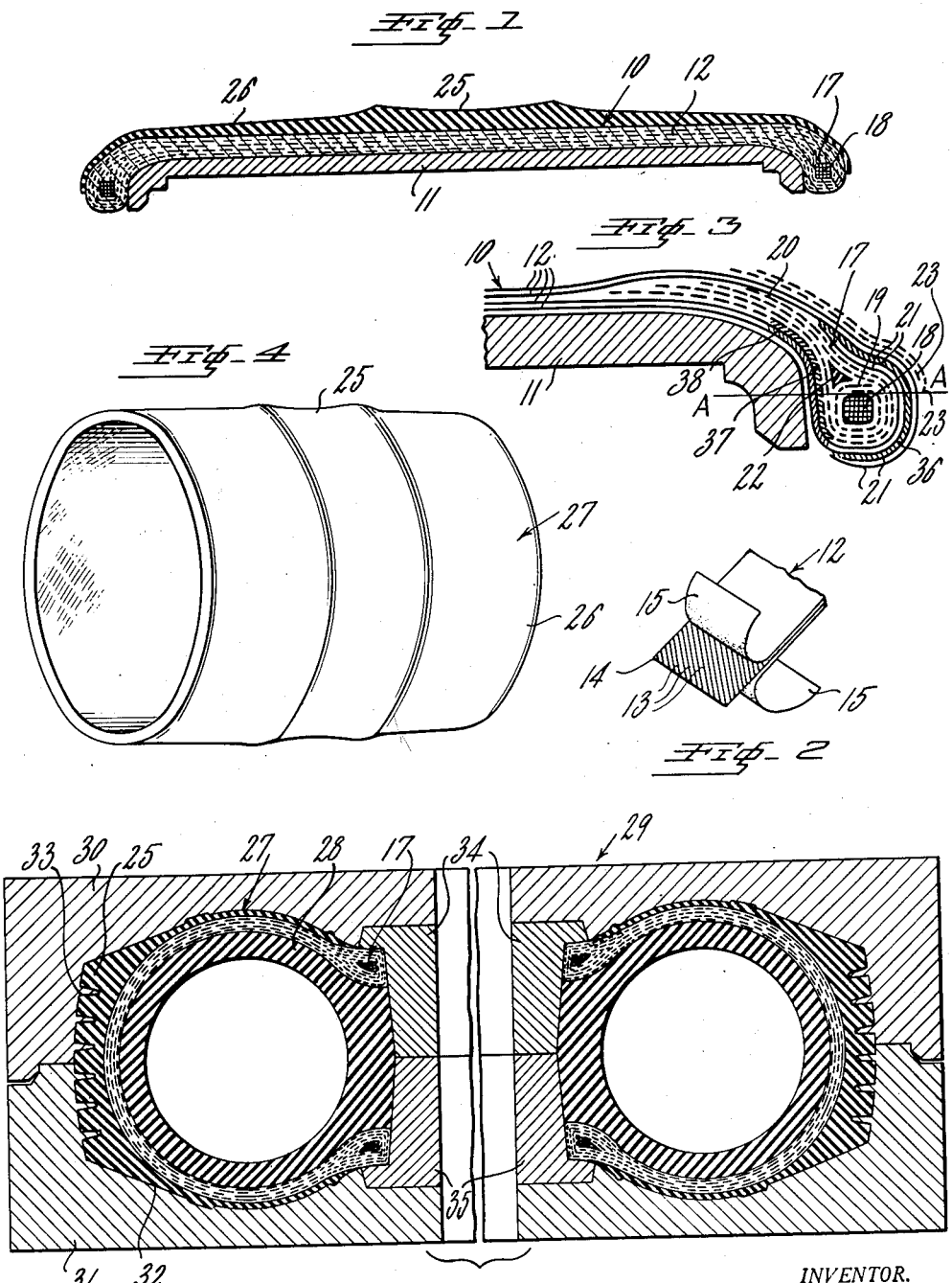

Patented Jan. 20, 1953

2,625,980

UNITED STATES PATENT OFFICE 2,625,980

METHOD OF MAKING PNEUMATIC TIRES

Martin Castricum, Grosse Pointe, Mich., assignor to United States Rubber Company, New York, N. Y., a corporation of New Jersey Application February 21, 1951, Serial No. 212,049

20 Claims. (Cl. 154—14)

This invention relates to an improved method of making pneumatic tires. More particularly, the invention relates to a method of making a tire, reinforced with stranded elements having overlapping portions extending around inextensible bead assemblies of the tire, involving the steps of applying within the raw tire carcass, in the areas of the overlapping portions of such reinforcing elements, a composition effective to render such areas more readily vulcanizable than the remainder of the tire, and vulcanizing such areas, so that the carcass reinforcing elements become fixedly anchored in such areas, and thereafter stretching the thus-anchored reinforcing elements and maintaining them in such stretched condition while the remainder of the tire is vulcanized in its final shape.

One object of the invention is to provide a method of manufacturing tires using a lesser area or quantity of stranded reinforcing material than has heretofore been necessary.

Another object of the invention is the provision of a method of making improved tires in which the tendency to growth, that is, the tendency to increase in cross-sectional size under the influence of inflation or operating stresses, is greatly reduced.

Still another object is to provide a tire exhibiting improved resistance to groove cracking and weather checking, as well as improved tread wear, compared to tires made in the conventional manner.

A further object is to provide an improved method of manufacturing pneumatic tires reinforced with synthetic textile elements, especially nylon, whereby any tendency to development of permanent tensile strains in the tread or sidewall portions of the tire during use is substantially reduced.

Further objects and advantages will be made evident in the following detailed description of the invention, when read with reference to the accompanying drawings, wherein:

Fig. 1 is a cross-sectional view of a portion of a raw tire casing assembled on a tire building drum in accordance with one method of carrying out the invention;

Fig. 2 is a perspective view of a portion of one of the plies of the tire casing;

Fig. 3 is a fragmentary sectional view on a larger scale of one edge of the tire carcass as assembled on the drum;

Fig. 4 is a perspective view of the raw tire casing in band form after removal from the drum;

Fig. 5 is a cross-sectional view of the tire being vulcanized in final shape in a mold.

Figure 6:
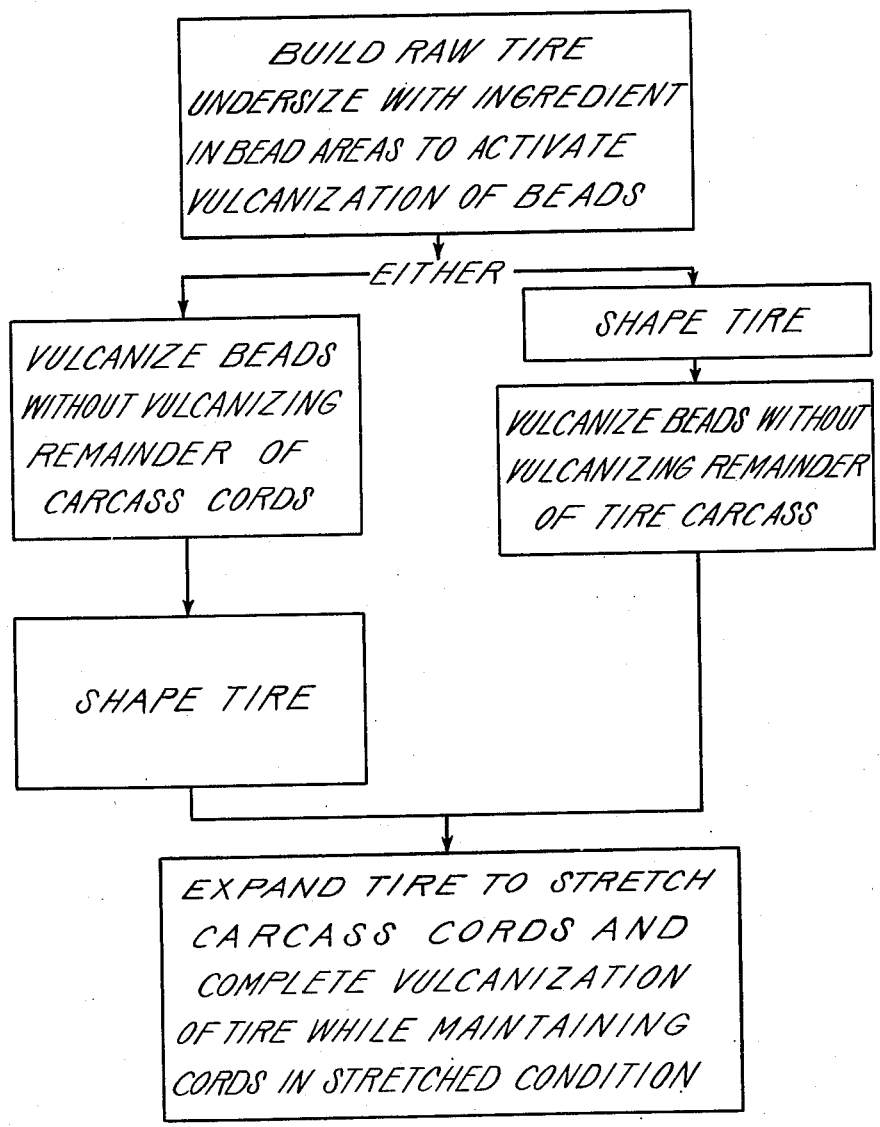
Fig. 6 is a flow diagram representing the process of the invention.

The invention contemplates assembly of the essential components of a pneumatic tire in a convenient manner, such as on a tire building drum. Thus, referring to Fig. 1, a carcass 10 of a raw tire may be built up on a building drum 11 from successive layers or plies of skim coated tire fabric 12. As shown in Fig. 2, such fabric comprises parallel stranded elements 13, usually plied yarns or cords, such as cotton, rayon or nylon yarns or cords, usually in the form of a weak weft cord fabric 14, treated with a resin-latex mixture, and thereafter coated on each side with a skim coating 15 of vulcanizable rubber carcass stock on a calender in the usual manner. The web fabric 14 is bias cut so that the textile elements 13 in the plies 12 run at an angle across the crown of the tire, alternate layers usually being arranged to run in opposite directions. Because the method of the present invention involves stretching the tire carcass during manufacture to an appreciably greater degree than occurs in conventional practice, it is preferable to bias cut the carcass fabric at a somewhat lesser angle, say 1° to 3° less, than would be employed conventionally for the same finally desired cord angle. It will be understood that the angle of the reinforcing elements as applied on the building drum is in general not the same as the cord angle in the finally shaped tire, due to the movement and expansion of the carcass which take place as the tire is shaped.

Inextensible bead elements 17, generally comprising, as shown in Fig. 3, a bundle of rubber-coated wires 18 wrapped with a strip of rubberized fabric 19, and covered with rubberized flipper strips 20, are associated with the edges of the carcass assembly by wrapping the free end portions 21 of the carcass plies 12 around and over the bead assembly 17 in overlapping relation therewith. The overlapping portions of the plies extending upwardly into the sidewall region are known as the ply lock-ups. The bead assembly usually includes a filling strip of rubber stock 22 known as the apex stock. Rubberized fabric strips 23, known as chafer strips, applied along the outer edges of the carcass, complete the carcass assembly. The shoulder set employed in building the carcass, that is, the distance from bead to bead, is less than the conventional shoulder set that would normally be employed for a tire of the same finally intended size and design. The shoulder set employed is below normal to the extent that, in order for the tire to attain its finally intended size, the carcass reinforcing elements are stetched an appreciable proportion of their original substantially relaxed length as assembled on the building drum. Such stretching is imparted to the carcass prior to final vulcanization of the tire.

Having thus assembled the carcass undersize with respect to its width, there is applied thereover a tread portion 25 and sidewall portions 26 of conventional vulcanizable rubber stocks which have been formed previously in suitable lengths, usually by extrusion. The ends of the tread assembly are spliced together on the drum to form the complete raw tire structure in the form of an annular band 27 as shown in Fig. 4. The building drum 11 is equipped with the usual collapsing means (not shown) so that the band 27 can be removed therefrom for further shaping and vulcanizing steps.

The present method is characterized by the fact that there is applied locally in the bead areas of the plies 12 within the undersize raw tire carcass assembly 10, while the carcass is in the process of being built as previously described, a composition effective to promote the rapid local vulcanization of such areas, to the end that such local vulcanization will cause the textile reinforcing filaments 13 of the carcass to become fixedly anchored in place, the rest of the tire assembly remaining in an unvulcanized state. The raw tire band 27 may be permitted to stand at room temperature while such local vulcanization takes place, or the tire may be heated to a moderately elevated temperature, that is, a temperature sufficiently elevated to vulcanize the sensitized areas but insufficient to vulcanize the remainder of the tire. If desired, the sensitized bead portion only may be heated to produce vulcanization only in that area.

For example, the surface edges of the fabric plies 12 may be coated with a rapidly vulcanizing rubber cement as the carcass 10 is being assembled on the drum 11, such cement containing a migratory ingredient, such as Beutene (butyraldehyde-aniline accelerator), capable of diffusing from the cement into the carcass stock, to render the carcass stock in such areas sensitive to mild vulcanizing conditions, and the tire band 27 may then be stored in a hot room at 120° to 175° F. for 12 to 48 hours. The degree of vulcanization of such areas must be such that such areas will not soften, permitting the textile material to loosen and slip around the beads, when the tire is subsequently heated to vulcanizing temperatures in an expanded condition.

The raw tire 27, having the reinforcing elements thus anchored by vulcanization of the bead areas, is then shaped in toroidal form with the aid of the usual vacuum shaping box (not shown) wherein an inflatable curing bag 28 (Fig. 5) is inserted in the tire. Since the tire carcass was built undersize, it is preferred to use a correspondingly undersize curing bag in order to facilitate insertion of the bag into the casing. The shaped tire containing the curing bag is placed in a tire mold 29. The mold shown in Fig. 5 has separable upper and lower mold halves 30 and 31 defining a toroidal confining and shaping cavity 32. The cavity 32 is considerably larger than the undersize tire casing, and essentially corresponds to the finally desired tire size. Internal pressure is applied to the curing bag to cause the tire to expand and fill out the mold cavity 32 in pressurized contact with the walls thereof, thereby stretching the textile reinforcing elements in the carcass. The tread portion 33 of the mold is designed to impart a suitable anti-skid pattern to the tread 25 of the tire. During this expansion operation the rims or beads of the tire are held to a fixed diameter with the aid of toe rings 34 and 35 disposed within the mold. The tire is maintained in such expanded condition while it is vulcanized by heating in the mold. The degree of stretching or elongation of the textile reinforcing elements should be sufficient to remove a substantial portion of the tendency of the carcass elements to stretch subsequently when the finished tire is subjected to inflation and operating pressures. It has been found that the objects of the invention are most advantageously attained when the amount of expansion of the tire carcass is sufficient to stretch the textile elements by at least 3% of their original substantially relaxed length as assembled on the tire building drum, depending on the nature of the particular textile reinforcing filaments employed. In the case of the usual nylon reinforcing material, the degree of stretching is preferably in the range of from 6% to 12%. In the case of the usual rayon tire reinforcement the degree of stretching is preferably in the range of from 4% to 6%, while the usual low stretch cotton tire cords are preferably stretched from 3% to 5% of their original relaxed length in the carcass. If desired, the textile elements may be stretched to a greater extent than the values indicated, e. g. the stretch may be 20%, or even more in those cases when the elements have sufficiently high elongation to permit such stretching. The stretching of the textile reinforcement within the tire casing in the manner described makes it possible to employ considerably less tire fabric, than is required in constructing a corresponding size tire in conventional practice. Furthermore, it is found that as a result of the stretching operation, considerably less growth is observed, especially in tires reinforced with synthetic textile materials, notably rayon, and more especially nylon, the latter having such high stretch characteristics that growth of tires reinforced with nylon has heretofore been a particularly serious problem. Any tendency of the reinforcing elements to acquire a permanent set under the influence of operating or inflation stresses is greatly reduced, by stretching prior to final cure in the manner described, with the result that there is less tendency for the tire to develop permanent tensile strains in the rubber of the tread or sidewalls in use. Such tensile strains commonly develop in conventional tires, especially rayon tires and more especially nylon tires, and the rubber in such a strained condition is peculiarly susceptible to deterioration, particularly to that mode of cracking or checking due to attack by sunlight or the ozone in the atmosphere, with the result that the tire is subject to premature failure from this cause. The cut growth resistance is poor and the bases of the tread grooves are especially susceptible to such cracking when the rubber is under tension. The rubber under tension is also less resistant to abrasion, with the result that the useful life of the tire tread is shortened. The foregoing deteriorating influences are observed to be significantly reduced when the reinforcing cords are anchored in place by vulcanizing the surface edges of the carcass plies in the manner of the invention and subsequently stretched during final vulcanization of the tire. The improvement is most remarkable in the case of nylon reinforced tires.

The substance applied to the bead areas of the carcass plies in the process of assembly for the purpose of producing local vulcanization either at room temperature, or with the aid of elevated temperatures, may comprise any migratory ingredient, that is, any rubber-soluble ingredient, capable of diffusing into the area to which it is applied and rendering such area relatively more readily vulcanizable than the remainder of the carcass stock. The usual vulcanizable rubber carcass stocks will contain sulfur, an organic accelerator of the class designated as carbon disulfide accelerators (cf. pages 302–303 of "Chemistry and Technology of Rubber" by Davis and Blake), and a combined metal activator of vulcanization (e. g. zinc oxide). Such vulcanizable compositions are rendered highly sensitive to mild vulcanization conditions by association with basic materials, such as mono-, di- and tri-alkyl amines, dibenzylamine, tri-amylamine, aniline, basic aniline derivatives, etc. Such basic materials may be applied locally to the overlapping end areas of the carcass plies in accordance with the invention for the purpose of increasing the sensitivity of such areas to vulcanization. Preferred activating substances which are useful for this purpose are the aldehyde-amine accelerators (e. g. Beutene, i. e. butyraldehyde-aniline reaction product, aldehyde-aniline reaction product, reaction product of ethyl chloride, formaldehyde and ammonia). The guanidine accelerators (e. g. diphenyl guanidine, diorthotolyl guanidine, triphenyl guanidine), and the dithiocarbamate and thiuram accelerators may also be used as activating materials. Diisoamylammonium diisoamyldithiocarbamate has been found to be a particularly rapidly acting material for the present purpose, and when combined with an amine, such as tributyl amine, it is unusually rapidly acting and is capable of producing the desired local cure even at room temperature. All of the foregoing produce an appreciable increase in the rate of vulcanization of the vulcanizable carcass stock accelerated with the usual carbon disulfide type accelerator, and are useful, when applied locally within the bead areas of the raw tire carcass, for rendering such areas appreciably more rapidly vulcanizable than the remainder of the raw tire. One or more of such activating ingredients may be applied in pure form, or admixed with other materials, as in the form of a solution or dispersion. The activating composition may include a rubber solvent or softening agent, to aid in diffusing the ingredient into the carcass stock. The activating composition may take the form of a rubber strip or layer in which the activating ingredient is incorporated, and which may be inserted in the carcass assembly in the area of the ends of the carcass plies, whereby the activating ingredient may produce the desired effect on the carcass stock in such area. The activating ingredient may be incorporated in portions of the bead assembly, such as the flipper strips and bead wrap, or may be incorporated in the chafer strips in sufficient quantity to diffuse into the carcass stock in the bead areas. The activating ingredient may be incorporated in the apex stock within the bead assembly in concentrations sufficiently high so that appreciable amounts thereof diffuse into the carcass stock, rendering it sensitive. If desired, various activating ingredients capable of augmenting each other in activating effect may be applied separately in different areas, to be combined in the carcass stock by diffusion. For example, one activating ingredient, such as diisoamylammonium diisoamyldithiocarbamate, may be applied to or incorporated in certain parts of the bead area, while another activating ingredient, such as tributyl amine, may be applied to or incorporated in other parts of the bead area, so that when both of such activating ingredients mingle in the carcass stock by diffusion, the stock is rendered unusually rapidly vulcanizable. In all cases, it will be understood that the desired result is to effect comparatively rapid vulcanization of the bead areas of the carcass plies so that the textile elements in the carcass become fixedly anchored against slippage upon subsequent stretching, the remainder of the tire being left essentially unvulcanized so that it can be stretched to an appreciably larger size during the final vulcanizing operation.

The desired local vulcanization is preferably effected by applying a migratory activating ingredient of the foregoing character in conjunction with a rubber cement composition. Such cement may be brushed, sprayed, or otherwise applied to the edge areas of the surfaces of the carcass plies as they are being assembled on the drum, or it may be applied to the outside of the rubber covered bead assembly 17 before it is incorporated in the assembly. Such cement will typically contain, per 100 parts of rubber, about 0.5 to 3 parts of a rapid accelerator, such as a carbon disulfide type accelerator, 50 to 500 parts of the migratory activating ingredient, such as Beutene or other aldehyde-amine accelerator, and small amounts of sulfur and zinc oxide, the whole being dissolved in a suitable solvent such as gasoline. The assembled tire carcass may then be stored in a warm place to permit diffusion of the activator into the carcass stock and to cause local vulcanization to take place. If desired, the process may be accelerated by applying mild heat locally to the bead areas. For example, the raw tire assembly may be mounted on toe rings (i. e. the separable parts of the tire mold, e. g. rings 34, 35 in Fig. 5, which aid in maintaining the beads in place and in imparting the desired shape thereto) which have been pre-heated, thereby raising the temperature of the tire in the bead areas, and promoting the local vulcanization of the activated area. As indicated in the accompanying flow diagram, Fig. 6, the local vulcanization of the carcass to fix the textile reinforcing elements against slippage may be accomplished either before preliminary shaping while the tire is in band form, or after preliminary shaping when the tire is in toroidal form.

The preferred area for application of the activating ingredient embraces the bottom or terminal portion of the bead, that is, the area below a line drawn transversely of the bead and passing along the upper portion of the bead wire bundle, as indicated by the line A—A in Fig. 3.

An example of the method of practicing the invention will now be described in detail. The essential steps of the process may be followed by reference to Fig. 6. A passenger car tire carcass was built up in band form on a tire building drum using 4 plies of bias cut nylon tire fabric composed of 210 denier 4/2 size nylon tire cords, maintained in parallel relation by a coating of rubber-resin composition to form a web fabric or weftless fabric. The web fabric was skim coated on each side with a conventional vulcanizable rubber carcass stock including sulphur, zinc oxide, and mercaptobenzothiazole accelerator as the principal vulcanizing ingredients. The cord angle on the building drum was about 59°. The finally intended size of the tire was the 8.20–15 size. The "shoulder set" employed, that is, the distance from bead to bead across the building drum, was 18⅝ inches, this being appreciably less than the 20¼ inches shoulder set that would ordinarily be employed for a tire of the same design and final size. The carcass was therefore built undersize with respect to its width. Such narrow shoulder set permits the tire to be stretched the desired degree to the finally desired size.

As the plies of tire fabric were applied to the building drum, the areas of the plies passing around the beads were brushed with a rubber cement of the following composition (all parts being by weight):

| | Parts |
|---|---|
| Rubber | 100.0 |
| Carbon black | 45.0 |
| Sulfur | 2.6 |
| Mercaptobenzothiazole | 1.0 |
| Zinc oxide | 5.0 |
| Stearic acid | 4.0 |
| Pine tar | 1.6 |
| Butyraldehyde-aniline | 265.0 |
| Solvent (e. g. gasoline) | 2290.0 |

As the various plies were assembled on the drum the foregoing cement was applied to the surfaces of the plies near the lateral edges thereof, at the shaded areas 36, as shown in Fig. 3, where the ends of the outer plies overlap the turned-over ends of the inner plies, and the cement was also applied at shaded areas 37 between the inner side of the bead assembly 17 and the inner ply members, as well as between the two inner plies at shaded area 38 where such plies pass along the inside of the bead assembly. The usual chafer strips 23 were then applied, and the tread and sidewall assembly was applied to the carcass.

The completed undersize raw tire band was removed from the building drum and permitted to stand in a hot room at 158° F. for 24 hours. During this time the bead areas of the tire carcass became substantially vulcanized due to the fact that the butyraldehyde-aniline in the rubber cement diffused into the carcass stock in the bead areas, rendering such areas more readily vulcanizable, while the remainder of the tire, being less readily vulcanizable, underwent no vulcanization. The ends of the nylon reinforcing cords in the carcass were thus firmly anchored therein.

The undersize tire casing was then shaped in toroidal form in a vacuum shaping box, and a curing bag inserted therein, whereupon the tire was placed in a tire mold. The mold had a cavity of the size usually employed for an 8.20–15 size tire, although the raw tire at this stage was appreciably smaller than a conventional raw 8.20–15 tire, due to the narrow shoulder set employed in building the carcass.

Under the influence of heat and internal pressure applied to the tire in the mold, the undersize tire casing expanded to fill the mold and was vulcanized in this shape in the usual manner. The amount of stretch imparted to the tire cord during curing in this particular case was about 8% of the original relaxed length of the cord as assembled on the drum.

The finished tire was removed from the mold, and inflated at 24 pounds pressure. After twenty-four hours at such inflation pressure, various dimensions of the tire, as indicated in Table I, were measured in order to demonstrate the resistance of the tire to growth, or to expand under the influence of inflation pressures.

TABLE I

*Inflation growth measurements*

| | Cross-Section | Overall Diameter | Section Height | Average Section |
|---|---|---|---|---|
| Tire: | | | | |
| A (Conventional) inches | 8.17 | 30.48 | 7.77 | 7.97 |
| B (Beads Pre-cured) inches | 8.08 | 29.96 | 7.51 | 7.80 |

Table I shows a comparison of the inflation growth behavior of a conventional nylon tire compared to a tire made according to the invention. Both tires were of the same design and were vulcanized in the same size mold. Tire A was assembled with a normal shoulder set and the nylon cords therein were stretched only very little during vulcanization. Tire B was assembled with a narrow shoulder set, and after anchoring the nylon plies with the special rubber cement as described, the cords were stretched 8% during final vulcanization. The cross-section of the tire was measured across the inflated tire from the outer surface of one sidewall to the other at the point of maximum width. The section height was the vertical distance from the plane of the base of the tire rim to the plane of the tread surface. The value referred to as the average section is one-half of the sum of the cross-section and the section height.

Table I indicates that the tire of the present invention has improved growth characteristics since it increases in size much less than the conventional tire under the influence of inflation stresses. This reduction in inflation growth is particularly evidenced in improvement in resistance to tread groove cracking and side wall checking, compared to conventional nylon tires, as well as in improved tread wear. These improvements are the direct result of the fact that the decrease in growth largely eliminates the tendency of the rubber in the tire to be placed in a condition of permanent tensile strain, as indicated previously.

In actual service tests, tires made according to the present invention displayed relatively less growth than conventional tires and, after a comparatively short period of service, displayed no appreciable further growth, whereas conventional tires continued to grow indefinitely. This is illustrated by the data in Table II which shows a comparison of the percentage increases (based on the size of the mold in which the tire was made) in average section of a conventional tire and a tire made by the present method, measured after running the tire various distances.

TABLE II

*Service growth test*

PERCENT INCREASE IN AVERAGE SECTION

| Miles | Tire C | Tire D |
|---|---|---|
| 1,000 | 3.1 | 5.4 |
| 2,000 | 3.4 | 7.2 |
| 3,000 | 3.4 | 7.7 |
| 5,000 | | 8.4 |
| 5,500 | | 8.5 |

In Table II, tire C was a 9.00–20 size 8-ply nylon tire, produced according to the invention. This tire increased relatively little in average section in service, and attained a virtually constant size after a relatively brief period of service, as evidenced by the fact that no growth was observed between the 2000 and 3000 mile measurements. Tire D, on the other hand, was a conventional nylon tire of the 11.00–22 size, and this tire, even though it contained 12 plies, and had two additional breaker plies, or shock pads, as added reinforcement, still grew appreciably more than tire C on a comparative percentage basis. Furthermore, tire D continued to increase in size after tire C had stopped growing, as evidenced by comparison of the measurements at various mileages. Thus, at 5500 miles tire D still had not attained a constant size, but was continuing to grow.

Tires reinforced with rayon plied yarn stretched within the carcass after pre-cure of the bead areas in the manner described also showed considerable reduction in growth, compared to rayon reinforced tires made in the conventional manner.

The invention is preferably practiced with reinforcing cords made of nylon because the high stretch characteristics of nylon have heretofore made it difficult to construct a nylon tire that was not highly susceptible to growth. The nylon carcass tire produced by this method retains the excellent strength characteristics of the nylon, and the good flexing characteristics, high temperature resistance and the low water absorption of the nylon also remain unimpaired.

Thus, the desirable qualities of the nylon have been retained, while greatly reducing the undesirable tendency to growth.

It should be noted that the benefits of the present invention are not obtainable by pre-stretching the textile reinforcing material before it is assembled in the tire, as has heretofore been suggested in the case of such synthetic textile reinforcement as nylon. Such prestretching procedures result in relatively inappreciable improvement in growth characteristics of the tire, compared to the improvements obtained in the present invention wherein the nylon is stretched within the carcass and maintained in the stretched condition while the tire is vulcanized in its final shape. If it is attempted to obtain substantial reduction in the growth tendency of the nylon tire by prestretching the nylon to an extreme degree at elevated temperature to impart substantial permanent set thereto, it is found that the fatigue properties of the nylon are seriously impaired with the result that the tire does not have satisfactory service life. The present invention avoids the difficulty inherent in such prestretching methods, since it does not impair the physical properties of the nylon.

A further advantage of the present invention is that substantial economies are effected in the amount of textile material required for a tire of a given size. For example, by the present method, a cotton reinforced tire may be made utilizing 3% to 5% by area less cotton fabric than is required for the conventional tire. This economy is the direct result of the fact that the improved tire is built on the building drum with less than the usual shoulder set, that is, less than the usual width of fabric, and the cord is thereafter stretched to the desired size previous to final vulcanization. Further economy of textile material in the tire is realized from the fact that it is unnecessary to incorporate additional plies of material in the carcass in an attempt to counteract to some extent the tendency to growth, as has frequently been the conventional practice.

As a result of the fact that the bead areas of the tire are vulcanized before final shaping in the tire mold, the method of the present invention, regardless of the type of reinforcing material used, results in improvements in the shaping of the bead area, largely eliminating defects which sometimes occur in conventional tire manufacture due to the fact that the uncured bead areas become improperly positioned or distorted in the mold.

The tensioning of the carcass reinforcing elements which takes place in the present process has the further beneficial effect of properly aligning the yarns or cords at the desired cord angle and path throughout the length of the cords, thereby eliminating the uneven or wavy effect sometimes obtained by conventional methods. This in itself results in more uniform tires of superior quality and performance, whether reinforced with natural filaments such as cotton, or synthetic filaments such as rayon or nylon, because the cord path and uniformity thereof has considerable influence on the flexing characteristics and life of the tire and improves uniformity of load distribution to each cord.

Having thus described my invention, what I claim and desire to protect by Letters Patent is:

1. In a method of making a pneumatic tire including the steps of assembling vulcanizable rubber tread and sidewall portions and a carcass of rubberized stranded reinforcing elements overlapping inextensible beads, and subsequently vulcanizing the resulting assembly while stretching said stranded reinforcing elements, the improvement which comprises the step of fixedly anchoring said stranded reinforcing elements against slippage during said stretching by applying, in the bead areas of the reinforcing elements, a composition effective to render said areas relatively rapidly vulcanizable compared to the remainder of the assembly, and vulcanizing said areas prior to said stretching without vulcanizing the remainder of the assembly.

2. A method as in claim 1 in which the stranded reinforcing material is cotton.

3. A method as in claim 1 in which the stranded reinforcing material is rayon.

4. A method as in claim 1 in which the stranded reinforcing material is nylon.

5. In a method of making a pneumatic tire involving the steps of superimposing a plurality of plies of tire fabric comprising textile reinforcing elements coated with vulcanizable rubber carcass stock to form a raw tire carcass, overlapping the ends of said plies around inextensible bead assemblies, applying vulcanizable rubber tread and sidewall portions to said carcass assembly, and vulcanizing the resulting assembly in toroidal form, the improvement which comprises the steps of incorporating within the raw tire carcass assembly, in the areas of said beads, a composition effective to render said areas rapidly vulcanizable compared to the remaining vulcanizable rubber portions of the tire, vulcanizing said areas without appreciable vulcanization of the said remaining portions to fix the said textile reinforcing elements against slippage upon subsequent stretching, and thereafter expanding the tire assembly to a larger size to stretch the said textile elements by from 3% to 20%, and vulcanizing the remainder of the tire while maintaining it in such expanded condition.

6. A method of making a pneumatic tire involving the steps of superimposing a plurality of plies of bias cut tire fabric comprising nylon cord fabric coated on each side with vulcanizable rubber carcass stock to form a raw tire carcass, overlapping said plies around inextensible wire bead assemblies, applying vulcanizable rubber tread and sidewall portions to said carcass assembly, incorporating within the raw tire carcass assembly, in the areas of said beads a composition effective to render said areas rapidly vulcanizable compared to the remaining vulcanizable rubber portions of the tire, vulcanizing said areas without appreciable vulcanization of the said remaining portions to fix the said nylon fabric against slippage upon subsequent stretching, and thereafter expanding the tire assembly to a larger size to stretch the said nylon fabric, and vulcanizing the remainder of the tire while maintaining it in such expanded condition.

7. A method as in claim 6, in which the nylon fabric is stretched by from 6% to 12%.

8. A method of making a pneumatic tire involving the steps of superimposing a plurality of plies of tire fabric comprising rayon reinforcing elements coated with vulcanizable rubber carcass stock to form a raw tire carcass, overlapping the ends of said plies around inextensible wire bead assemblies, applying vulcanizable rubber tread and sidewall portions to said carcass assembly, incorporating within the raw tire carcass assembly, in the areas of said overlapping portions of said carcass plies, a composition effective to render said areas rapidly vulcanizable compared to the remaining vulcanizable rubber portions of the tire, vulcanizing said areas without appreciable vulcanization of the said remaintaining portions to fix the said rayon reinforcing elements against slippage upon subsequent stretching, shaping the tire in toroidal form, expanding the tire assembly to a larger size to stretch the said rayon elements by from 4% to 6%, and vulcanizing the remainder of the tire while maintaining it in such expanded condition.

9. In a method of making a pneumatic tire involving the steps of assembling a tire carcass of plies of textile fabric rubberized with a vulcanizable rubber carcass stock, said plies having overlapping portions extending around inextensible beads, associating a vulcanizable rubber tread and sidewall portion with said carcass, and vulcanizing the resulting tire assembly in toroidal form, the improvement which comprises applying locally within the carcass in the area of said beads an activating ingredient which is capable of diffusing into said carcass stock and increasing the tendency of said area to vulcanize, compared to the remaining portions of the carcass, vulcanizing said areas without appreciable vulcanization of said remaining portions, to fixedly anchor said carcass plies against slippage around the beads upon subsequent stretching, and thereafter expanding the tire assembly to a larger size to stretch said textile fabric, and vulcanizing the tire in such expanded condition.

10. A method of making a pneumatic tire comprising the steps of building a tire carcass of a plurality of plies of fabric coated with a vulcanizable rubber carcass stock, incorporating inextensible bead assemblies in the marginal edges of said carcass, applying within the carcass, in the areas of said beads, a vulcanizable rubber cement containing a migratory ingredient capable of activating said carcass stock, associating said carcass with vulcanizable rubber tread and sidewall portions, diffusing said migratory activating ingredient into the carcass stock in said bead areas, subjecting the resulting raw tire assembly to a temperature sufficient to vulcanize the activated bead areas without vulcanizing the remainder of the carcass, shaping the raw tire in toroidal form, inserting the tire in a mold cavity larger than the tire, expanding the tire to fill the mold cavity and to stretch the fabric, and heating the tire to effect vulcanization thereof.

11. A method of making a pneumatic tire comprising the steps of building a tire carcass of a plurality of plies of tire fabric coated with a vulcanizable rubber carcass stock, incorporating inextensible bead assemblies in the marginal edges of said carcass, applying within the carcass, in the areas of said beads, a composition containing a migratory ingredient capable of activating said carcass stock, associating said carcass with vulcanizable rubber tread and sidewall portions, heating the bead areas only of the resulting assembly to a temperature sufficient to vulcanize the activated bead areas without vulcanizing the remainder of the carcass, shaping the raw tire in toroidal form, inserting the tire in a mold cavity larger than the tire, expanding the tire to fill the mold cavity and to stretch the fabric, and heating the tire to complete vulcanization thereof.

12. A method of making a pneumatic tire comprising the steps of building a tire carcass in band form of a plurality of superimposed plies of bias cut tire fabric comprising fabric skim coated on each side with a vulcanizable rubber carcass stock, applying to the surfaces of said plies near the lateral edges thereof a composition containing a migratory activating ingredient capable of diffusing into the carcass stock to render said lateral edges of the plies more readily vulcanizable than the remainder of the plies, wrapping said lateral edges of the plies around inextensible wire bead assemblies, applying vulcanizable rubber tread and sidewall portions to the carcass band, vulcanizing the carcass in the area of said applied activating ingredient without vulcanizing the remainder of the tire, shaping the tire band in toroidal form, inserting a curing bag therein, placing the shaped tire in a tire mold having a cavity sufficiently larger than the tire so that the fabric must be stretched in order for the tire to conform to the cavity, applying internal pressure to the curing bag while heating the mold to cause the tire to conform to the cavity and while retaining the beads of the tire in a fixed position so that the fabric of the tire carcass is stretched, and completing vulcanization of the tire in the stretched condition.

13. A method of making a pneumatic tire comprising the steps of building a tire carcass in band form of a plurality of superimposed plies of bias cut tire fabric comprising fabric skim coated on each side with a vulcanizable rubber carcass stock, applying to the surfaces of said plies near the lateral edges thereof a composition containing a migratory activating ingredient capable of diffusing into the carcass stock to render said lateral edges of the plies more readily vulcanizable than the remainder of the plies, wrapping said lateral edges of the plies around inextensible wire bead assemblies, applying vulcanizable rubber tread and sidewall portions to the carcass band, vulcanizing the carcass in the area of said applied activating ingredient without vulcanizing the remainder of the tire, shaping the tire band in toroidal form, and inserting a curing bag therein, placing the shaped tire in a tire mold having a cavity sufficiently larger than the tire so that the fabric must be stretched by at least 3% in order for the tire to conform to the cavity, applying internal pressure to the curing bag while heating the mold to cause the tire to conform to the cavity and while retaining the beads of the tire in a fixed position so that the fabric of the tire carcass is stretched, and completing vulcanization of the tire in the stretched condition.

14. A method of making a pneumatic tire comprising the steps of building a tire carcass in band form of a plurality of superimposed plies of bias cut tire fabric comprising nylon fabric skim coated on each side with a vulcanizable rubber carcass stock, applying to the surfaces of said plies near the lateral edges thereof a composition containing a migratory activating ingredient capable of diffusing into the carcass stock to render said lateral edges of the plies more readily vulcanizable than the remainder of the plies, wrapping said lateral edges of the plies around inextensible wire bead assemblies, applying vulcanizable rubber tread and sidewall portions to the carcass band, vulcanizing the carcass in the area of said applied activating ingredient without vulcanizing the remainder of the tire, shaping the tire band in torodial form, inserting a curing bag therein, placing the shaped tire in a tire mold having a cavity sufficiently larger than the tire so that the nylon fabric must be stretched in order for the tire to conform to the cavity, applying internal pressure to the curing bag while heating the mold to cause the tire to conform to the cavity and while retaining the beads of the tire in a fixed position so that the nylon fabric of the tire carcass is stretched, and completing vulcanization of the tire in the stretched condition.

15. A method of making a pneumatic tire comprising the steps of building a tire carcass in band form of a plurality of superimposed plies of bias cut tire fabric comprising rayon fabric skim coated on each side with a vulcanizable rubber carcass stock, applying to the surfaces of said plies near the lateral edges thereof a composition containing a migratory activating ingredient capable of diffusing into the carcass stock to render said lateral edges of the plies more readily vulcanizable than the remainder of the plies, wrapping said lateral edges of the plies around inextensible wire bead assemblies, applying vulcanizable rubber tread and sidewall portions to the carcass band, vulcanizing the carcass in the area of said applied activating ingredient without vulcanizing the remainder of the tire, shaping the tire band in toroidal form, inserting a curing bag therein, placing the shaped tire in a tire mold having a cavity sufficiently larger than the tire so that the rayon fabric must be stretched in order for the tire to conform to the cavity, applying internal pressure to the curing bag while heating the mold to cause the tire to conform to the cavity and while retaining the beads of the tire in a fixed position so that the rayon fabric of the tire carcass is stretched, and completing vulcanization of the tire in the stretched condition.

16. A method of making a pneumatic tire comprising the steps of building a tire carcass in band form of a plurality of superimposed plies of bias cut tire fabric comprising cotton fabric skim coated on each side with a vulcanizable rubber carcass stock, applying to the surfaces of said plies near the lateral edges thereof a composition containing a migatory activating ingredient capable of diffusing into the carcass stock to render said lateral edges of the plies more readily vulcanizable than the remainder of the plies, wrapping said lateral edges of the plies around inextensible wire bead assemblies, applying vulcanizable rubber thread and sidewall portions to the carcass band, vulcanizing the carcass in the area of said applied activating ingredient without vulcanizing the remainder of the tire, shaping the tire band in toroidal form, inserting a curing bag therein, placing the shaped tire in a tire mold having a cavity sufficiently larger than the tire so that the cotton fabric must be stretched by at least 3% in order for the tire to conform to the cavity, applying internal pressure to the curing bag while heating the mold to cause the tire to conform to the cavity and while retaining the beads of the tire in a fixed position so that the cotton fabric of the tire carcass is stretched, and completing vulcanization of the tire in the stretched condition.

17. A method of making a pneumatic tire comprising the steps of building a tire carcass in band form of a plurality of superimposed plies of bias cut tire fabric comprising rayon fabric skim coated on each side with a vulcanizable rubber carcass stock, applying to the surfaces of said plies near the lateral edges thereof a composition containing a migratory activating ingredient capable of diffusing into the carcass stock to render said lateral edges of the plies more readily vulcanizable than the remainder of the plies, wrapping said lateral edges of the plies around inextensible wire bead assemblies, applying vulcanizable rubber tread and sidewall portions to the carcass band, vulcanizing the carcass in the area of said applied activating ingredient without vulcanizing the remainder of the tire, shaping the tire band in toroidal form, inserting a curing bag therein, placing the shaped tire in a tire mold having a cavity sufficiently larger than the tire so that the rayon fabric must be stretched by at least 3% in order for the tire to conform to the cavity, applying internal pressure to the curing bag while heating the mold to cause the tire to conform to the cavity and while retaining the beads of the tire in a fixed position so that the rayon fabric of the tire carcass is stretched, and completing vulcanization of the tire in the stretched condition.

18. A method of making a pneumatic tire comprising the steps of building a tire carcass in band form of a plurality of superimposed plies of bias cut tire fabric comprising nylon fabric skim coated on each side with a vulcanizable rubber carcass stock, applying to the surfaces of said plies near the lateral edges thereof a composition containing a migratory activating ingredient capable of diffusing into the carcass stock to render said lateral edges of the plies more readily vulcanizable than the remainder of the plies, wrapping said lateral edges of the plies around inextensible wire bead assemblies, applying vulcanizable rubber tread and side wall portions to the carcass band, vulcanizing the carcass in the area of said applied activating ingredient without vulcanizing the remainder of the tire, shaping the tire band in toroidal form, inserting a curing bag therein, placing the shaped tire in a tire mold having a cavity sufficiently larger than the tire so that the nylon fabric must be stretched by at least 3% in order for the tire to conform to the cavity, applying internal pressure to the curing bag while heating the mold to cause the tire to conform to the cavity and while retaining the beads of the tire in a fixed position so that the nylon fabric of the tire carcass is stretched, and completing vulcanization of the tire in the stretched condition.

19. A method of making a pneumatic tire comprising the steps of building a tire carcass in band form of a plurality of superimposed plies of bias cut tire fabric comprising rayon fabric skim coated on each side with a vulcanizable rubber carcass stock, applying to the surfaces of said plies near the lateral edges thereof a composition containing a migratory activating ingredient capable of diffusing into the carcass stock to render said lateral edges of the plies more readily vulcanizable than the remainder of the plies, wrapping said lateral edges of the plies around inextensible wire bead assemblies, applying vulcanizable rubber tread and sidewall portions to the carcass band, vulcanizing the carcass in the area of said applied activating ingredient without vulcanizing the remainder of the tire, shaping the tire band in a toroidal form, inserting a curing bag therein, placing the shaped tire in a tire mold having a cavity sufficiently larger than the tire so that the rayon fabric must be stretched by from 4% to 6% in order for the tire to conform to the cavity, applying internal pressure to the curing bag while heating the mold to cause the tire to conform to the cavity and while retaining the beads of the tire in a fixed position so that the rayon fabric of the tire carcass is stretched, and completing vulcanization of the tire in the stretched condition.

20. A method of making a pneumatic tire comprising the steps of building a tire carcass in band form of a plurality of superimposed plies of bias cut tire fabric comprising nylon fabric skim coated on each side with a vulcanizable rubber carcass stock, applying to the surfaces of said plies near the lateral edges thereof a composition containing a migratory activating ingredient capable of diffusing into the carcass stock to render said lateral edges of the plies more readily vulcanizable than the remainder of the plies, wrapping said lateral edges of the plies around inextensible wire bead assemblies, applying vulcanizable rubber tread and sidewall portions to the carcass band, vulcanizing the carcass in the area of said applied activating ingredient without vulcanizing the remainder of the tire, shaping the tire band in toroidal form, inserting a curing bag therein, placing the shaped tire in a tire mold having a cavity sufficiently larger than the tire so that the nylon fabric must be stretched by from 6 to 12% in order for the tire to conform to the cavity, applying internal pressure to the curing bag while heating the mold to cause the tire to conform to the cavity and while retaining the beads of the tire in a fixed position so that the nylon fabric of the tire carcass is stretched, and completing vulcanization of the tire in the stretched condition.

MARTIN CASTRICUM.

REFERENCES CITED

The following references are of record in the file of this patent:

UNITED STATES PATENTS

| Number | Name | Date |
|---|---|---|
| 1,389,960 | Mell | Sept. 6, 1921 |
| 2,467,322 | Lightbrown et al. | Apr. 12, 1949 |
| 2,476,884 | Maynard | July 19, 1949 |
| 2,497,226 | McNeill | Feb. 14, 1950 |